(12) United States Patent
Missotten et al.

(10) Patent No.: US 10,039,234 B2
(45) Date of Patent: Aug. 7, 2018

(54) HYBRID DRIVE SYSTEM FOR A HARVESTER

(71) Applicant: CNH Industrial America LLC, New Holland, PA (US)

(72) Inventors: Bart M. A. Missotten, Herent (BE); Guy H. J. Osselaere, Loppem (BE); Karel C. F. Pauwels, Ingelmunster (BE); Vincent B. P. Theunynck, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 332 days.

(21) Appl. No.: 14/782,214

(22) PCT Filed: Apr. 8, 2014

(86) PCT No.: PCT/EP2014/057078
§ 371 (c)(1),
(2) Date: Oct. 2, 2015

(87) PCT Pub. No.: WO2014/166957
PCT Pub. Date: Oct. 16, 2014

(65) Prior Publication Data
US 2016/0037722 A1 Feb. 11, 2016

(30) Foreign Application Priority Data
Apr. 9, 2013 (BE) .................................. 2013/0257

(51) Int. Cl.
*B60R 22/00* (2006.01)
*E05F 15/00* (2015.01)
(Continued)

(52) U.S. Cl.
CPC ....... *A01D 69/005* (2013.01); *A01D 41/1274* (2013.01); *A01D 41/1275* (2013.01);
(Continued)

(58) Field of Classification Search
CPC .............. A01D 69/005; A01D 41/1274; A01D 41/1275; A01D 43/087; B60W 20/19; B60W 10/30
(Continued)

(56) References Cited

U.S. PATENT DOCUMENTS

| | | |
|---|---|---|
| 4,215,545 A | 8/1980 | Morello et al. |
| 4,348,863 A | 9/1982 | Taylor et al. |

(Continued)

FOREIGN PATENT DOCUMENTS

| | | |
|---|---|---|
| AT | 506883 A2 | 12/2009 |
| DE | 3247289 A1 | 10/1983 |

(Continued)

OTHER PUBLICATIONS

English Translation for EP1935697A1.*

*Primary Examiner* — Mahmoud S Ismail
(74) *Attorney, Agent, or Firm* — Patrick Sheldrake

(57) ABSTRACT

A hybrid drive system for an auxiliary load includes a hydraulic auxiliary power storage. This hydraulic auxiliary power storage has a plurality of hydraulic power storage units. The hybrid drive system further comprises an power exchange control system that selectively connects a predetermined selection of one or more of the hydraulic power storage units to the hydraulic auxiliary power unit; and controls the power exchange of the auxiliary power unit as a function of the operating period by the predetermined selection.

12 Claims, 7 Drawing Sheets

(51) Int. Cl.
*G05D 1/00* (2006.01)
*G05D 3/00* (2006.01)
*G06F 7/00* (2006.01)
*G06F 17/00* (2006.01)
*A01D 69/00* (2006.01)
*B60K 6/12* (2006.01)
*B60W 10/30* (2006.01)
*B60W 20/19* (2016.01)
*A01D 41/127* (2006.01)
*B65G 67/24* (2006.01)
*G06F 7/70* (2006.01)
*G06F 19/00* (2018.01)
*G06G 7/00* (2006.01)
*G06G 7/76* (2006.01)
*F16H 61/4096* (2010.01)

(52) U.S. Cl.
CPC ............... *B60K 6/12* (2013.01); *B60W 10/30* (2013.01); *B60W 20/19* (2016.01); *B65G 67/24* (2013.01); *B60Y 2200/222* (2013.01); *B60Y 2304/072* (2013.01); *B60Y 2400/14* (2013.01); *F16H 61/4096* (2013.01); *Y02T 10/6208* (2013.01)

(58) Field of Classification Search
USPC ...................................................... 701/48, 50
See application file for complete search history.

(56) References Cited

U.S. PATENT DOCUMENTS

| | | | |
|---|---|---|---|
| 4,741,410 | A | 5/1988 | Tunmore |
| 5,168,703 | A | 12/1992 | Tobias |
| 5,495,912 | A | 3/1996 | Gray, Jr. et al. |
| 6,543,311 | B1 | 4/2003 | Baginski et al. |
| 7,597,172 | B1 | 10/2009 | Kovach et al. |
| 7,779,616 | B2 | 8/2010 | Sheidler et al. |
| 7,992,370 | B2 | 8/2011 | Sheidler et al. |
| 8,145,395 | B2 | 3/2012 | Degroot et al. |
| 2004/0118623 | A1 | 6/2004 | Shore et al. |
| 2007/0079609 | A1 | 4/2007 | Brinkman et al. |
| 2008/0086254 | A1 | 4/2008 | Anderson et al. |
| 2009/0126360 | A1 | 5/2009 | Bordwell et al. |
| 2009/0241534 | A1 | 10/2009 | Tikkanen et al. |
| 2009/0266067 | A1 | 10/2009 | Persson et al. |
| 2010/0122864 | A1 | 5/2010 | Rosman |
| 2010/0140043 | A1 | 6/2010 | Thompson et al. |
| 2010/0141024 | A1 | 6/2010 | Fouquet et al. |
| 2011/0066337 | A1* | 3/2011 | Kormann ............ A01D 43/087 701/50 |

FOREIGN PATENT DOCUMENTS

| | | | |
|---|---|---|---|
| EP | 1935697 A1 * | 6/2008 | ............... B60K 6/12 |
| EP | 1935697 A1 | 6/2008 | |
| WO | 2012031970 A1 | 3/2012 | |

* cited by examiner

HYBRID DRIVE SYSTEM FOR A HARVESTER

This application is the US National Stage filing of International Application Serial No. PCT/EP2014/057078 filed on Apr. 8, 2014 which claims priority to Belgian Application BE2013/0257 filed Apr. 9, 2013, each of which is incorporated herein by reference in its entirety.

FIELD OF THE INVENTION

The present invention generally relates to a harvester, more particularly a harvester comprising a main drive, such as an internal combustion engine, powering an intermittent auxiliary load, such as for example a crop unloading system.

BACKGROUND OF THE INVENTION

Electric and hydraulic hybrid vehicle drive systems that comprise, next to a main drive, an electric or hydraulic auxiliary drive are generally known. However when applying such a hybrid drive system to drive all harvester functions it would result in a hydraulic or electric storage system that would have unmanageable dimensions and weights exceeding allowable limits. Therefor there have been proposed such electric or hydraulic hybrid vehicle drive systems of which the main drive, in the form of an internal combustion engine, is directly driving the main loads of the harvester and the electric or hydraulic auxiliary drive is used to drive one or more auxiliary loads.

EP2130735 describes one particular electric hybrid drive system for a harvester in which certain auxiliary loads, such as for example the unloading auger on a combine are driven by an auxiliary electric drive that is powered from a battery. This battery is charged by means of a generator mechanically coupled to the main drive in the form of an internal combustion engine. An auxiliary power control unit is provided that controls the power exchange between the internal combustion engine and the battery in function of the intermittent operation of for example the unloading auger. Such a system however presents several disadvantages, first of all each of the additional components for the electric drive system form a single point of failure. This means as soon as the motor or the generator or the battery fails the auxiliary load cannot be operated anymore. The battery and the generator further need to be dimensioned, often with a predetermined safety margin, to generate and store sufficient energy for the complete operating period of the auxiliary load, including any peak load, for example during startup of the unloading auger of a combine. Additionally, the number of intermittent operation periods the battery is able to perform, without unacceptable degradation is limited which affects the long term peak performance of the system, especially when the intermittent operating periods are repetitive and form an operating cycle with a frequency of for example a plurality of operating periods per hour. Finally, the addition of an electric motor for driving the auxiliary load represents a serious modification of the design of the harvester and makes it difficult to retrofit an existing combine harvester design with such a system as for example all auxiliary drives need to be provided with an electric motor.

Thus there still exists a need for a harvester comprising a hybrid vehicle drive system that overcomes the above mentioned disadvantages and allows for a system that is able to handle peak loads, such as for example during startup of an intermittent auxiliary load, efficiently and reliably.

SUMMARY OF THE INVENTION

According to a first aspect of the invention there is provided a hybrid drive system for a harvester comprising:
a main drive;
a reservoir of hydraulic fluid;
a hydraulic power storage for storing hydraulic fluid at a pressure higher than that of the reservoir;
a hydraulic power unit being:
    mechanically connected to the main drive;
    hydraulically connected to the hydraulic power storage and to the reservoir;
an intermittent auxiliary drive configured to be powered intermittently by the main drive during an operating period such that the main drive powers the intermittent auxiliary drive during an activated time period and the main drive does not power the intermittent auxiliary drive during a deactivated time period;
a power exchange control system coupled to the hydraulic power unit and the power storage,
Characterized in that
the hydraulic power storage comprises a plurality of hydraulic power storage units; and in that
the power exchange control system is configured to selectively connect a first subset and at least one different, other subset of one or more of the hydraulic power storage units to the hydraulic power unit in function of a desired bidirectional power exchange between the main drive and the hydraulic power storage in function of the operating period.

The possibility of selectively connecting these subsets of hydraulic power storage units makes it possible for the hydraulic power unit to pressurise any one of these subsets to the required level for handling the maximum peak loads occurring during the operating period of an intermittent load faster than when all hydraulic power storage units of the hydraulic power storage would be pressurized concurrently. This effect is especially useful when the duration of a deactivated time period of the operating period of the intermittent auxiliary drive would not be sufficiently long to pressurize all hydraulic power storage units to the required level to handle the peak loads of the intermittent auxiliary drive. Such a situation could for example occur in the context of a harvester unloading harvested crop to a transport cart pulled by a transport vehicle alongside the harvester, while it continues its harvesting operation. When the unloading activity is for example interrupted because a first transport cart is full and shortly thereafter a second empty transport cart is provided this could result in particular operating period of the intermittent auxiliary drive that powers the crop unloading device with a deactivated time period too short to charge the hydraulic power storage in its entirety to handle the peak load occurring at the time of the start-up of the crop unloading device for transferring the crop to the second empty transport cart. The reliability of the hybrid drive system for handling peak loads will thus be improved, especially in such situations, as the ability to selectively connect subsets of the hydraulic power units of the hydraulic power storage will result in at least one of these subsets to be pressurized faster to the required pressure for handling peak loads. This subset will then subsequently be available to be connected to the hydraulic power unit when it needs to provide the required peak power to the main drive to handle these peak loads even when the hybrid drive system encounters unexpected unfavourable operating conditions.

According to a preferred embodiment the power exchange control system is configured to:
- determine for the activated time period:
  - a peak load time period during which the average power required by the intermittent auxiliary load is higher than the average power required by the intermittent auxiliary load during the activated time period; and
  - a nominal load time period during the remaining part of the activated time period;
- determine for the deactivated time period an initial deactivated time period followed by a subsequent deactivated time period; and
- connect the first subset during the peak load time period and during the initial deactivated time period;
- connect the at least one other subset during the nominal load time period and during the subsequent deactivated time period.

This advantageous, simple and robust control scheme for suitably connecting the respective subsets ensures that the first subset is sufficiently pressurized to provide the necessary peak power to cope with the peak loads of the intermittent auxiliary load. It is not critical that the other subsets are able to reach this level of hydraulic pressure as they only need to provide sufficient power to cope with the lower average power requirements during the nominal load time period.

According to a further embodiment the power exchange control system is further configured to determine the peak load time period such that it comprises a start-up time period, which is an initial phase of the activated time period during which the intermittent auxiliary load is activated.

The largest peak loads of such an intermittent auxiliary drive often occur during this start-up time period. These peak loads can often be quantified as a predetermined multiple of the average nominal load with an estimated maximum duration that is largely a function of the inertia of the intermittent auxiliary drive. This results in a simple and efficient way to configure the timing and duration of the peak load time period in the power exchange control system.

Preferably the first subset comprises a hydraulic storage capacity that is smaller than or equal to the total hydraulic storage capacity of the one or more other subsets, and the power exchange control system is configured to:
- connect the first subset during the peak load time period and during the initial deactivated time period, the hydraulic storage capacity of the first subset in this way allowing for a faster build-up of hydraulic pressure during the initial deactivated time period such that maximum peak power can subsequently be delivered during the peak load time period and;
- connect the at least one other subset during the nominal load time period and during the subsequent deactivated time period, the total hydraulic storage capacity of the one or more other subsets in this way ensuring that these other subsets allow for a larger amount of pressurized hydraulic fluid to be stored during the subsequent deactivated time period to cover the power requirements during the nominal load time period.

This embodiment optimizes the configuration of the first subset in function of the peak power requirements with a shorter duration during the peak load time period and the configuration of the other subsets in function of the nominal power requirements with a longer duration during the nominal load time period.

According to still a further preferred embodiment the first subset comprises a hydraulic storage capacity that is smaller than or equal to the individual hydraulic storage capacity of the one or more other subsets, and the power exchange control system is configured to:
- connect the first subset during the peak load time period and during the initial deactivated time period, the hydraulic storage capacity of the first subset in this way ensuring that the first subset is the subset allowing for the fastest build-up of hydraulic pressure during the initial deactivated time period such that maximum peak power can subsequently be delivered during the peak load time period and;
- connect the at least one other subset during the nominal load time period and during the subsequent deactivated time period, the hydraulic storage capacity of each of the one or more other subsets in this way ensuring that these other subsets allow for the largest amount of pressurized hydraulic fluid to be stored during the subsequent deactivated time period to cover the power requirements during the nominal load time period.

This embodiment still further optimizes the configuration of the first subset in function of the peak power requirements with a shorter duration during the peak load time period and the configuration of the other subsets in function of the nominal power requirements with a longer duration during the nominal load time period.

According to still a further embodiment the power exchange control system is configured to connect a plurality of the other subsets in a predetermined sequence.

This embodiment allows the power exchange control system to connect the subsets according to a particularly simple and robust routine, for example one after the other. In the particular case that for example all subsets have an equal storage capacity this will still further reduce complexity of the control requirements for the hydraulic power unit as then for each of the subsets the same control scheme can be repeated.

According to a further embodiment the power exchange control system is further connected to a hydraulic pressure sensor configured to measure the hydraulic pressure in the one or more hydraulic power storage units of the first subset when connected to the hydraulic power unit, and the power exchange control system is further configured to:
- switch from the initial deactivated time period to the subsequent deactivated time period when the pressure in the one or more hydraulic power storage units of the first subset reaches an upper pressure threshold; and/or
- switch from the peak load time period to the nominal load time period when the pressure in the one or more hydraulic power storage units of the first subset reaches a lower pressure threshold.

Setting the time periods of the control scheme in function of these pressure thresholds ensures a robust operation that is able to cope efficiently with any variations occurring to the operating time period, for example during successive operating periods of the intermittent auxiliary load.

According to still a further embodiment
- the main drive is an internal combustion engine;
- the intermittent auxiliary drive (40) is operable to drive a crop unloading system configured to intermittently unload harvested crop from a crop storage bin of the harvester; and
- the power exchange control system is configured to adjust the upper pressure threshold and/or the lower pressure threshold in function of one or more of the following harvesting condition parameters:
  - type of crop being harvested;
  - filling degree of the crop storage bin;

moisture content of the crop;

blockage detection of the crop unloading system;

average load on the main drive.

This further refines and optimizes the adaptive behaviour of the power exchange control system.

According to still a further embodiment:

the plurality of hydraulic power storage units is a plurality of hydraulic accumulators; and the power exchange control system comprises a hydraulic selection circuit coupled to the hydraulic power unit and the plurality of hydraulic accumulators, the hydraulic selection circuit comprising a plurality of hydraulic valves respectively coupled to each of the plurality of hydraulic accumulators, the power exchange control system being configured to perform the selection of the subsets of the plurality of hydraulic accumulators by means of these hydraulic valves.

This allows for a modular setup of the hydraulic components and maximizes flexibility in possible combinations of hydraulic accumulators for the desired subsets.

According to a further embodiment:

the hydraulic power unit is a single hydraulic unit that is:
  operable in both a hydraulic motor mode and a hydraulic pump mode; and
  connected at a source side to the reservoir of hydraulic fluid and at a storage side to the hydraulic auxiliary power storage; and the power exchange control system is configured to operate the hydraulic power unit:
  in the hydraulic motor mode during the activated time period for exchanging power from the hydraulic auxiliary power storage to the main drive;
  in the hydraulic pump mode during the deactivated time period for exchanging power from the main drive to the hydraulic auxiliary power storage.

In this way the hybrid drive system can be implemented without requiring a high amount of hydraulic components and can be easily retrofitted to an existing drive system.

Preferably the power exchange control system further comprises a hydraulic anti-cavitation circuit coupled to the hydraulic power unit and configured to provide hydraulic fluid to the storage side of the hydraulic power unit, when:
  the hydraulic power unit is operated in the hydraulic motor mode; and
  all hydraulic power storage units are disconnected from the hydraulic power unit.

This further increases the overall robustness of the hybrid drive system.

Optionally the hydraulic power unit is further connected at the source side to a pre-charge hydraulic pump that is configured to provide hydraulic fluid to the hydraulic power unit at a pre-charge pressure, and the anti-cavitation circuit comprises:
  a first one-way valve connected between the source side of the hydraulic power unit and the pre-charge hydraulic pump, and configured to prevent a flow of hydraulic fluid from the source side of the hydraulic power unit to the pre-charge hydraulic pump; and
  a second one-way valve connected between the storage side of the hydraulic power unit and the pre-charge hydraulic pump, such that it bypasses the first one-way valve, and configured to prevent a flow of hydraulic fluid from the storage side of the hydraulic power unit to the pre-charge hydraulic pump;
  a pressure control valve connected between the source side of the hydraulic auxiliary power unit and the reservoir of hydraulic fluid, such that it bypasses the first one-way valve and the pre-charge hydraulic pump, and configured to prevent a flow of hydraulic fluid from the source side of the hydraulic auxiliary power unit to the reservoir of hydraulic fluid when the pressure at the source side does not exceed an opening pressure, this opening pressure being equal to or higher than the pre-charge pressure.

In this way the anti-cavitation circuit can be implemented without requiring complex hydraulic components and can assure fail safe operation even when for example the electronic controller of the power exchange control system is powered down.

According to a preferred embodiment:

the power exchange control system further comprises an overpressure protection circuit coupled to the hydraulic auxiliary power unit and configured to prevent further pressure generation at the storage side of the hydraulic power unit, when:
  the hydraulic power unit is operated in the hydraulic pump mode; and
  the pressure at the storage side of the auxiliary power unit exceeds an overpressure threshold.

This embodiment still further increases robustness of the hybrid drive system.

According to a second aspect of the invention there is provided a method of operating the hybrid drive system according to the first aspect of the invention, characterised in that the method comprises the steps of:
  the power exchange control system receiving an input signal representative of the intermittent operation of the intermittent auxiliary drive during the operation period;
  the power exchange control system determining from this input signal, in function of the desired bidirectional power exchange between the main drive and the hydraulic power storage during the operating period an output signal for selectively connecting the first subset and the at least one different, other subset of one or more of the hydraulic power storage units to the hydraulic auxiliary power unit;
  the power exchange control system providing the output signal to the hydraulic power storage.

Preferably the method comprises the further steps of:

the power exchange control system determining for the activated time period:
  a peak load time period during which the average power required by the intermittent auxiliary load is higher than the average power required by the intermittent auxiliary load during the activated time period; and
  a nominal load time period during the remaining part of the activated time period;
the power exchange control system determining for the deactivated time period an initial deactivated time period followed by a subsequent deactivated time period; and
the power exchange control system providing an output signal for connecting the first subset during the peak load time period and during the initial deactivated time period;
the power exchange control system providing an output signal for connecting the at least one other subset during the nominal load time period and during the subsequent deactivated time period.

This advantageous, simple and robust control scheme for suitably connecting the respective subsets ensures that the first subset is sufficiently pressurized to provide the necessary peak power to cope with the peak loads of the intermittent auxiliary load. It is not critical that the other subsets are able to reach this level of hydraulic pressure as they only need to provide sufficient power to cope with the lower average power requirements during the nominal load time period.

According to a further embodiment the method comprises the further steps of:

the power exchange control system determining the peak load time period such that it comprises a start-up time period, which is an initial phase of the activated time period during which the intermittent auxiliary load is activated.

The largest peak loads of such an intermittent auxiliary drive often occur during this start-up time period. These peak loads can often be quantified as a predetermined multiple of the average nominal load with an estimated maximum duration that is largely a function of the inertia of the intermittent auxiliary drive. This results in a simple and efficient way to configure the timing and duration of the peak load time period in the power exchange control system.

According to still a further embodiment the method comprises the further steps of the power exchange control system determining and providing an output signal to connect a plurality of the other subsets in a predetermined sequence.

This embodiment allows the power exchange control system to connect the subsets according to a particularly simple and robust routine, for example one after the other. In the particular case that for example all subsets have an equal storage capacity this will still further reduce complexity of the control requirements for the hydraulic power unit as then for each of the subsets the same control scheme can be repeated.

According to still a further embodiment the method for operating a hybrid drive system wherein the power exchange control system is further connected to a hydraulic pressure sensor configured to measure the hydraulic pressure in the one or more hydraulic power storage units of the first subset when connected to the hydraulic power unit, is characterised in that the method comprises the further steps of:

the power exchange control system receiving an input signal from the hydraulic pressure sensor representative of the hydraulic pressure in the one or more hydraulic power storage units of the first subset when connected to the hydraulic power unit;

the power exchange control system:
switching from the initial deactivated time period to the subsequent deactivated time period when the pressure in the one or more hydraulic power storage units of the first subset reaches an upper pressure threshold; and/or switching from the peak load time period to the nominal load time period when the pressure in the one or more hydraulic power storage units of the first subset reaches a lower pressure threshold.

Setting the time periods of the control scheme in function of these pressure thresholds ensures a robust operation that is able to cope efficiently with any variations occurring to the operating time period, for example during successive operating periods of the intermittent auxiliary load.

According to still a further embodiment the method for operating a hybrid drive system wherein:
the main drive is an internal combustion engine;
the intermittent auxiliary drive (40) is operable to drive a crop unloading system configured to intermittently unload harvested crop from a crop storage bin of the harvester, is characterised in that the method comprises the further steps of:

the power exchange control system receiving an input signal representative of one or more of the following harvesting condition parameters:
type of crop being harvested;
filling degree of the crop storage bin;
moisture content of the crop;
blockage detection of the crop unloading system;
average load on the main drive.

the power exchange control system determining and providing an output signal to adjust the upper pressure threshold and/or the lower pressure threshold in function of one or more of these harvesting condition parameters.

This further refines and optimizes the adaptive behaviour of the power exchange control system.

According to a third aspect of the invention there is provided a computer program comprising computer readable instructions adapted to perform the method according to the second aspect of the invention.

According to a fourth aspect of the invention there is provided a computer readable storage medium comprising the computer readable instructions of the computer program according to the third aspect of the invention.

DETAILED DESCRIPTION OF EMBODIMENT(S)

Figure 1A:
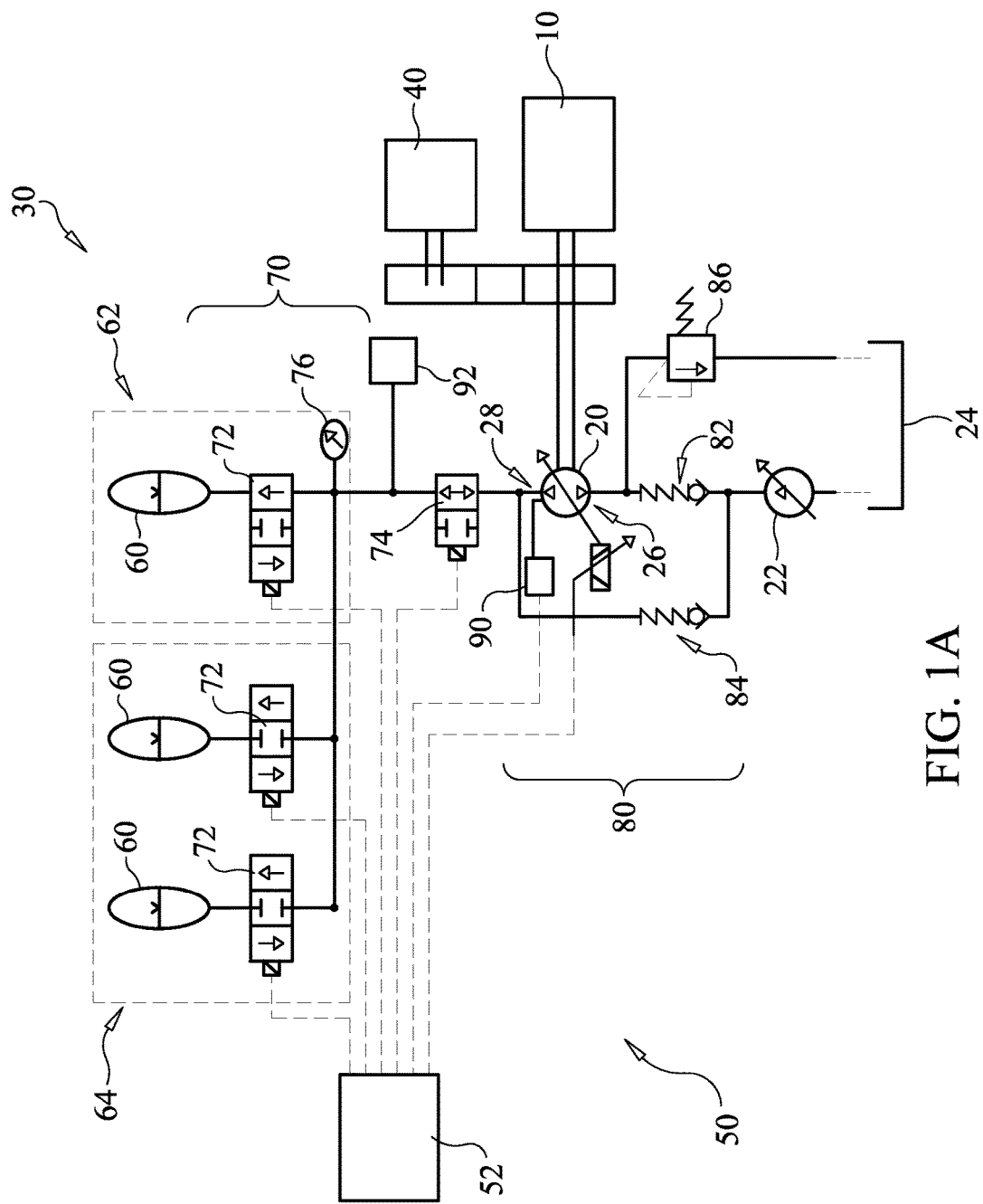
FIGS. 1A-1D schematically illustrate several states of a hybrid drive system for a harvester according to the invention.

FIG. 1A schematically illustrates a hybrid drive system for a harvester comprising a main drive 10, which often is an internal combustion engine. The harvester is for example a combine harvester, a forage harvester or any other type of harvester comprising an intermittent auxiliary drive 40. As shown in FIG. 1A, this intermittent drive 40 is mechanically coupled to the main drive 10. Such an intermittent auxiliary drive 40 is for example a crop unloading system that is able to intermittently unload harvested crop from a crop storage bin of a harvester, such as for example a grain unload auger of a combine harvester. Such an intermittent auxiliary drive 40, such as a grain unload auger is powered by the main drive 10, for example by means of suitable mechanical connection comprising for example gears, belts and/or clutches.

Figure 2:
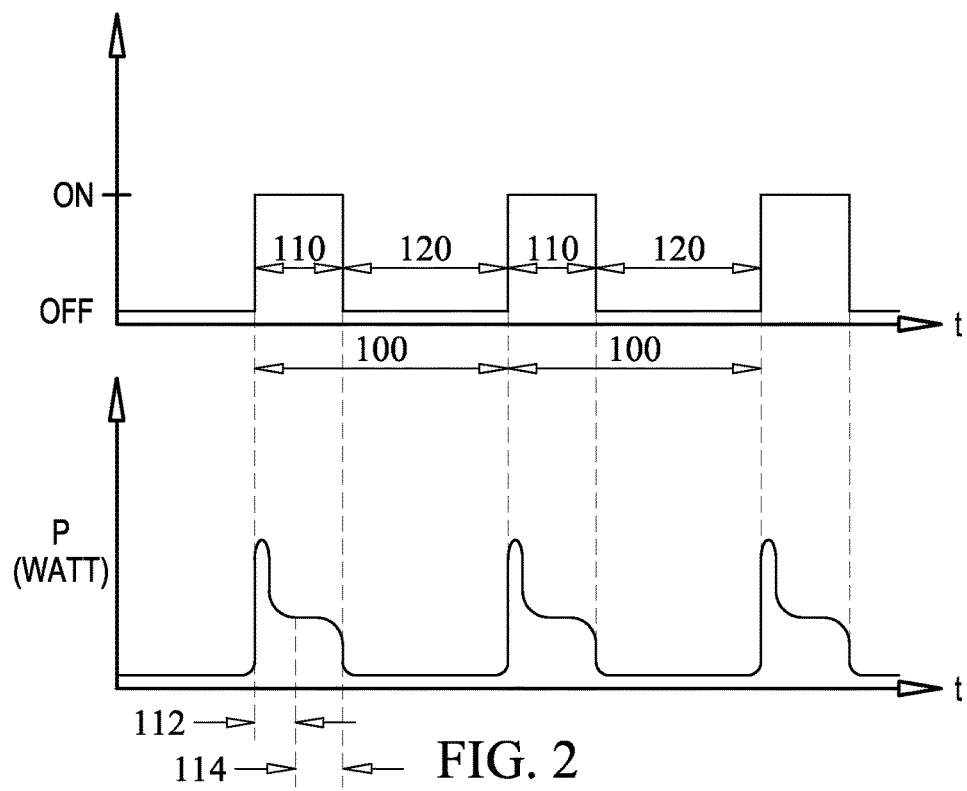
FIG. 2 schematically illustrates the respective time periods related to the intermittent operating period of the auxiliary load and the corresponding torque required by the auxiliary load.

As shown in FIG. 2, the auxiliary drive 40 comprises an operating period 100 comprising alternatingly an activated time period 110 and a deactivated time period 120. During the deactivated time period 120, the auxiliary drive 40, such as for example an unload auger, is often at rest and thus does not require power from the main drive, for example when the harvester is filling a crop storage bin with crop during a harvest operation. When the crop storage bin reaches a predetermined filling degree or when for example a transport cart is available for unloading the harvester, the unload auger, forming such an auxiliary drive 40 will be activated, for example by means of engaging a suitable clutch that drivingly connects this auxiliary drive 40 to the main drive 10, for unloading the crop from the crop storage bin of the harvester to the transport cart being driven alongside the harvester while it continues its harvesting activities. During this activated time period 110 the auxiliary drive 40 will thus consume a predetermined amount of power delivered by the main drive 10 and often in the initial phase of the activated time period, the auxiliary drive 40 will require a peak torque to be provided in order to allow for the initial acceleration of the auxiliary drive 40 when switching from its deactivated state to the activated state. This is clearly shown schematically in the lower part diagram of FIG. 2, which schematically illustrates the evolution of the Power P (in Watts) required by the auxiliary drive 40 during its intermittent operation. In the case of an unload auger of a combine harvester this peak torque, which occurs during a peak load time period 112, can exceed the average torque required during the rest of the activated time period 110, referred to as a nominal load time period 114, considerably. The peak load time period 112 during which the average power required by the intermittent auxiliary drive 40 is higher than the average power required by the intermittent auxiliary drive 40 during the activated time period 110 normally is shorter than the nominal load time period 114. In the example of a combine harvester filling a grain storage bin during harvest, the nominal deactivated time period 120 could for example measure between 2 to 15 minutes, for example 3 minutes. When subsequently the unload auger is activated for evacuating the grain from the grain storage bin, this could for example initiate an activated time period 110 for this auxiliary drive 40 of for example between 0.5 to 4 minutes, for example 1 minute. The peak load time period 112 will last for only about 1 to 5 seconds after which the nominal load time period 114 will follow. It is clear that the hybrid drive system is also suitable for handling other types of intermittent auxiliary drives 40. For example intermittent auxiliary drives 40 for which the operation is less cyclical in nature and have an intermittent operating period that is initiated by an operator, in the case of a combine harvester this could for example be a drive system for lifting the header during headland turns or an intermittent power boost to be provided to the drive of the threshing system in order to overcome a blockage that has occurred. It is further clear that the hybrid drive system is especially advantageous when the main drive is confronted with the load of such an intermittent auxiliary drive system while it needs to continue to ensure delivery of sufficient power to other drive systems that have a more continuous power requirement pattern.

As further shown in FIG. 1A the hybrid drive system for the harvester comprises a hydraulic power unit 20 that is mechanically connected to the main drive 10. In the embodiment shown in FIG. 1A this hydraulic power unit 20 is formed as a bidirectional variable displacement hydraulic pump that can also function as a variable displacement hydraulic motor, as will be explained in further detail below.

The hydraulic power unit 20 is at a storage side 28 hydraulically connected to a hydraulic power storage 30. At its source side 26 the hydraulic power unit 20 is hydraulically connected to a reservoir of hydraulic fluid 24, such as for example a suitable tank comprising a predetermined volume of hydraulic fluid. The hydraulic power storage 30 comprises a plurality of hydraulic power storage units 60. According to this embodiment three such hydraulic power storage units 60 are provided, however any other suitable plurality of storage units 60 could be used. As shown in FIG. 1A, these hydraulic power storage units 60 are embodied as hydraulic accumulators 60 with capacity of 20 to 100 litres, for example 50 litres, at an operating pressure in the range of 200 to 600 bar, for example 420 bar, and a maximum flow rate of 100 to 300 litres per minute, for example 250 litres per minute. The hydraulic power unit 20 will enable a bidirectional power exchange between the main drive 10 and the hydraulic power storage 30. This means that the hydraulic power unit 20, can extract power from the main drive, when pumping hydraulic fluid from the reservoir 24 to pressurize the hydraulic power storage 30 and alternatively is able to provide power to the main drive 10, when driven by pressurized hydraulic fluid released from the hydraulic power storage 30. As shown in FIG. 1A an power exchange control system 50 is provided to control this power exchange of the hydraulic power unit 20 comprising suitable hydraulic and electronic components. In the embodiment of FIG. 1A it comprises an electronic controller 52 that is coupled to a plurality of hydraulic components in order to control the flow of hydraulic fluid. This means that the electronic controller 52 is thus in general suitably coupled to the hydraulic power unit 20 and the hydraulic power storage 30 in order to control the power exchange by means of a suitable flow of hydraulic fluid to or from the hydraulic power storage 30. The power exchange control system 50 controls this power exchange of the auxiliary power unit 20 in function of the operating period 100 of the auxiliary drive 40. This means that during that during the low load, deactivated time period 120 the excess power available from the main drive 10 can be used to pressurize the hydraulic power storage 30 by operating the hydraulic power unit 20 as a hydraulic pump and that subsequently during the activated time period 110 the stored energy can be released from the hydraulic power storage 30 to supplement the power from the main drive 10 with that of the hydraulic auxiliary power unit 20.

As further shown in FIG. 1A, each of the hydraulic accumulators 60 is coupled to a corresponding hydraulic valve 72. A suitable hydraulic valve 72, as shown in FIG. 1A, allows for three states, namely directional flow into the hydraulic accumulator 60, directional flow out of the accumulator 60 and interruption of the flow. In this way the power exchange control system 50 comprises a hydraulic selection circuit 70 that couples the hydraulic accumulators 60 to the hydraulic auxiliary power unit 20. This allows the electronic controller 52 of the power exchange control system 50 to perform a selection of a subset 62, 64 of the plurality of hydraulic accumulators 60. According to the state of the hybrid drive system shown in FIG. 1A, a first subset 62 comprises a single hydraulic accumulator 60 connected to the hydraulic auxiliary power unit 20 by means of its associated hydraulic valve 72 such that a flow of hydraulic fluid is allowed into the hydraulic accumulator 60. Another subset 64, different from the first subset 62, comprises two hydraulic accumulators 60 which are disconnected from the auxiliary power unit 20 by means of their associated hydraulic valves 72. As shown, an additional valve 74 is provided in the hydraulic line between the hydraulic auxiliary power storage 30 and the storage side 28 of the hydraulic auxiliary power unit 20. This additional valve 74 is operable by the electronic controller 52 in two states, namely a state in which the flow is interrupted and a state in which bidirectional flow is allowed. The additional valve 74, as shown is optionally a normally closed valve, which in this way is able to interrupt any flow into or out of the hydraulic power storage 30 completely, which is for example desirable for example as a safety function. This safety function could for example guarantee that the hydraulic auxiliary power storage 30 will not interfere with the hybrid drive system when for example the harvester is powered down and the electronic controller 52 is no longer operational. Alternatively the additional valve 74 provides redundancy for safely interrupting hydraulic flow from or to the hydraulic power storage 30 for example when one or more of the hydraulic valves of the selection circuit 70 would fail. It is however clear that, according to the state of the hybrid drive system shown in FIG. 1A, the additional valve 74 is in a state that allows bidirectional flow into and out of the hydraulic power storage 30. In this state the hydraulic power unit 20 will be operated by the electronic controller 52 of the power exchange control system 50 in a hydraulic pump mode in which the hydraulic power unit 20 will exchange power from the main drive 10 to the hydraulic auxiliary power storage 30. In the state shown in FIG. 1A this means that the hydraulic power unit 20 will pump hydraulic fluid from the reservoir 24 to the hydraulic accumulator 60 of the first subset 62, which will cause the hydraulic pressure in this hydraulic accumulator 60 to rise. It is clear that the power exchange control system 50 will be operated in this way during the deactivated time period 120 of the intermittent auxiliary drive 40 as will be explained in more detail below with reference to FIGS. 1A and 1B. The hydraulic power unit 20 in this embodiment is a single hydraulic unit that is also operable in a hydraulic motor mode for exchanging power from the hydraulic power storage 30 to the main drive 10. Pressurized hydraulic fluid flowing from the hydraulic power storage 30 will then power the hydraulic power unit 20 after which it will be evacuated to the reservoir 24. It is also clear that the hydraulic power unit 20 will be operated in this hydraulic motor mode by the power exchange control system 50 during the activated time period 110 of the intermittent auxiliary drive 40 as will be explained in more detail below with reference to FIGS. 1C and 1D. The hydraulic power unit 20 is for example an axial piston pump that can also be operated as a reciprocating piston motor, preferably the hydraulic power unit 20 allows for proportional control of the amount of flow of hydraulic fluid during its operation by the electronic controller 52 of the hydraulic control system 50. A suitable design to enable this would for example be an axial piston pump using the swash plate principle to control the amount of hydraulic flow. As generally known such a design allows for the control of the flow of hydraulic fluid by means of a swash plate that modifies the volume swept by the pistons of the pump. As in general the flow of such a pump can be expressed as $Q_{charge} = n \cdot V_{stroke} \cdot \eta_{vol}$ ($Q_{charge}$: flow in m³/s; n: revolutions per second; $V_{stroke}$: swept volume by the pistons in m³; $\eta_{vol}$: volumetric efficiency), and during operation $\eta_{vol}$ can be treated as largely constant and also n can be seen as largely constant because the main drive 10 is normally an internal combustion engine being operated at a predetermined rotational frequency which allows for its most efficient operation, the flow $Q_{charge}$ will thus be largely proportional to the swept volume by the pistons as controlled by the setting of the swash plate. The control of the swept volume by the pistons Vstroke doesn't only allow for the control of the flow $Q_{charge}$, but equally allows for the control of the amount of the power exchanged from the main drive 10 to the hydraulic auxiliary power storage 30 as in general $P_{hydr,charge} = Q_{charge} \cdot \Delta p_{charge}$ ($P_{hydr,charge}$: Power in Watt (Nm/s); $\Delta p_{charge}$: pressure difference over the pump in N/m²).

Although as shown in FIGS. 1A-1D, the source side 26 of the hydraulic power unit 20 is connected via a hydraulic anti-cavitation circuit 80 and a pre-charge hydraulic pump 22 to the reservoir 24. In general it suffices if the hydraulic power unit 20 is connected at the source side 26 to the reservoir 24 of hydraulic fluid and at a storage side 28 to the hydraulic power storage 30. The pre-charge hydraulic pump 22 connected to the source side 26 of the hydraulic power unit 20 provides hydraulic fluid to the hydraulic power unit 20 at a predetermined pre-charge pressure in the range of for example 10 to 40 bar, for example 15 bar. This thus means that in the state shown in FIG. 1A the pre-charge hydraulic pump 22 will provide hydraulic fluid from the reservoir 24 at a pre-charge pressure of for example 15 bar to the source side 26 of the hydraulic power unit 20 via a first one-way valve 82 connected between the source side 26 of the hydraulic auxiliary power unit 20 and the pre-charge hydraulic pump 22. As shown, this first one-way valve 82 only allows a flow of hydraulic fluid from the pre-charge hydraulic pump 22 to the source side 26 of the hydraulic power unit 20 and prevents a flow of hydraulic fluid from the source side 26 of the hydraulic power unit 20 to the pre-charge hydraulic pump 22. In the state shown, the hydraulic power unit 20, being operated in a pump mode by the power exchange control system 50, will pump this flow of hydraulic fluid from the storage side 28 via the additional valve 74 and the associated hydraulic valve 72 to the hydraulic accumulator 60 of the first subset 62. This will cause the hydraulic pressure in this hydraulic accumulator 60 and thus also at the storage side 28 to rise, as will be explained in more detail with reference to FIG. 3. In this way the pressure in this hydraulic accumulator 60 will for example rise from a pressure below 300 bar to a pressure exceeding for example 400 bar. In this state the second one-way valve 84 of the anti-cavitation circuit 80 connected between the storage side 28 of the hydraulic power unit 20 and the pre-charge hydraulic pump 22, such that it bypasses the first one-way valve 82 will be in a closed state as it is configured to prevent a flow of hydraulic fluid from the storage side 28 of the hydraulic power unit 20 to the pre-charge hydraulic pump 22 as the pressure at the storage side of for example over 200 bar is higher than the pre-charge of for example 15 bar. In this state also the pressure control valve 86 of the anti-cavitation circuit 80 connected between the source side 26 of the hydraulic power unit 20 and the reservoir of hydraulic fluid 24 is in a closed stated. This pressure control valve 86 in this way bypasses the first one-way valve 82 and the pre-charge hydraulic pump 22. Such a pressure control valve 86 is of a normally closed type, and prevents a flow of hydraulic fluid 24 from the source side 26 of the hydraulic auxiliary power unit 20 to the reservoir of hydraulic fluid 24 when the pressure at the source side 26 does not exceed a predetermined opening pressure. According to the embodiment shown in FIG. 1A this opening pressure will be chosen slightly higher, for example 16 bar, than the pre-charge pressure, for example 15 bar, and the pressure control valve 86 will thus be in a closed state as the pre-charge pressure can be regulated by the pre-charge pump 22 as it is a variable displacement hydraulic pump which allows the pre-charge pressure to be controlled by for example the electronic controller 52. According to an alternative embodiment however it is also possible to make use of a fixed displacement hydraulic pump as a pre-charge pump, in that case the opening pressure of the pressure control valve 86 will determine the pre-charge pressure and the opening pressure will thus be chosen to be equal to the predetermined pre-charge pressure, for example 15 bar. In such an alternative embodiment the pressure control valve 86 will thus normally be in a state in which it regulates a suitable flow of hydraulic fluid to the reservoir 24 in order to prevent the pressure at the source side 26 from rising above the predetermined pre-charge pressure.

Figure 1B:
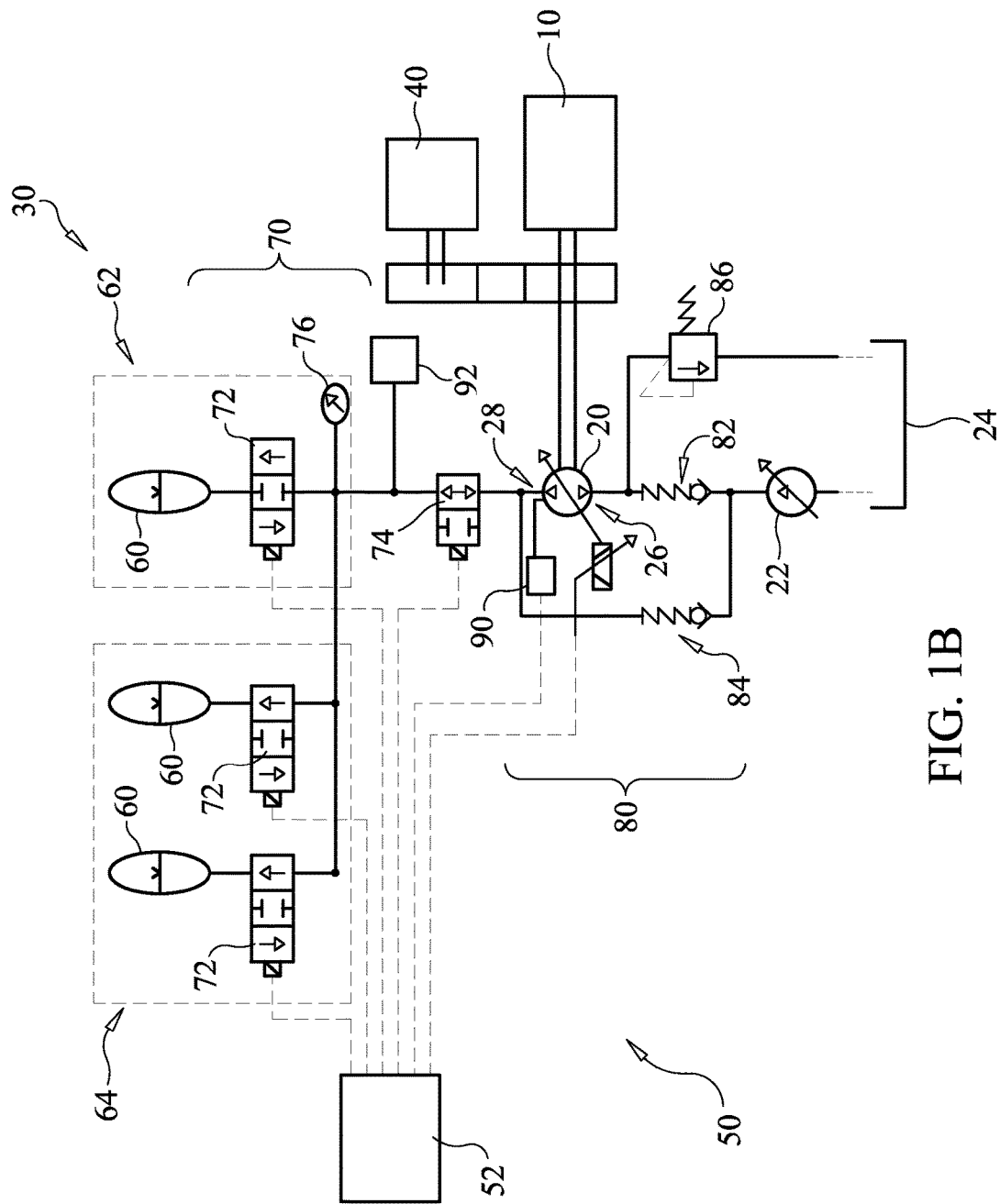

The state of the embodiment shown in FIG. 1B resembles the state of that of this embodiment in FIG. 1A. The main difference is to be found in the state of the hydraulic selection circuit 70. According to the state of the hybrid drive system shown in FIG. 1B, now the associated hydraulic valve 72 of the single hydraulic accumulator 60 of the first subset 62 is controlled by the electronic controller 52 to a state in which it disconnects this hydraulic accumulator 60 of the first subset 62 from the flow of hydraulic fluid being provided by the auxiliary power unit 20. As shown, the associated hydraulic valves 72 of both hydraulic accumulators 60 of the second subset 64 now connect these hydraulic accumulators 60 to the hydraulic auxiliary power unit 20 in such a way that a flow of hydraulic fluid is allowed into these hydraulic accumulators 60. All other elements such as for example the additional valve 74, the hydraulic power unit 20, the anti-cavitation circuit 80, the pre-charge hydraulic pump 22, . . . will function in general as described above with reference to FIG. 1A. This thus means that the hydraulic power unit 20 will be operated in a pump mode by the power exchange control system 50 and will pump a flow of hydraulic fluid from the storage side 28 via the additional valve 74 and both associated hydraulic valves 72 to both hydraulic accumulators 60 of the second subset 64. This will also cause the hydraulic pressure in both these hydraulic accumulators 60 and thus also at the storage side 28 to rise, as will be explained in more detail with reference to FIG. 3, for example from a pressure below 300 bar to a pressure above 400 bar.

Figure 1C:
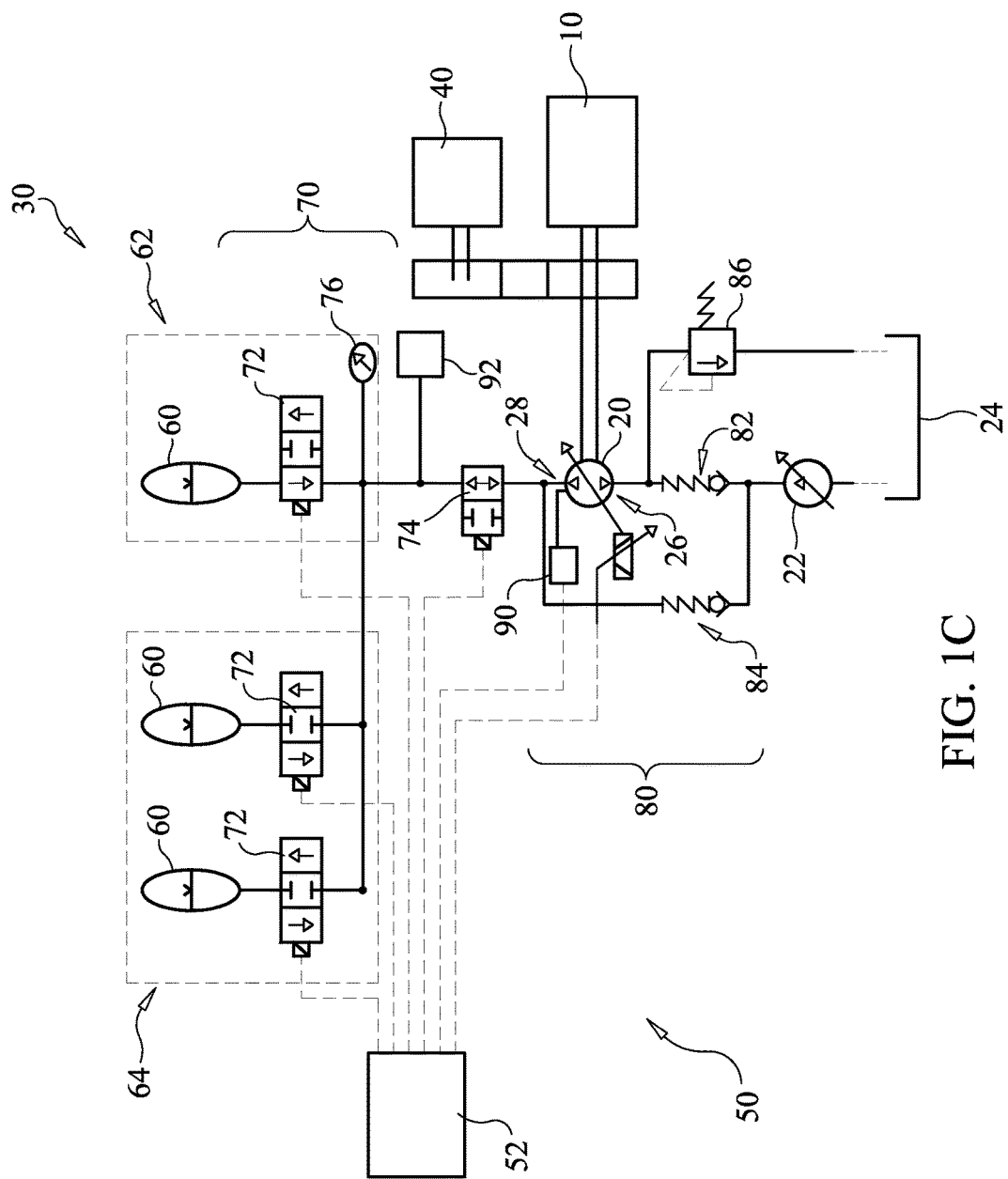

In the state of the embodiment, shown in FIG. 1C, the hydraulic auxiliary power unit 20 is operated in a hydraulic motor mode for exchanging power from the hydraulic power storage 30 to the main drive 10. In this state pressurized hydraulic fluid flowing from the hydraulic power storage 30 will now power the hydraulic power unit 20 after which it will be evacuated to the reservoir 24. It is also clear that the hydraulic power unit 20 will be operated in this hydraulic motor mode by the hydraulic control system 50 during the activated time period 110 of the intermittent auxiliary drive 40. The hydraulic power unit 20 is, as explained above, for example an axial piston pump now being operated as a reciprocating piston motor and preferably allows for proportional control of the amount of flow of hydraulic fluid during its operation by the electronic controller 52 of the power exchange control system 50. As already mentioned in general the amount of the flow of hydraulic fluid that will flow from the hydraulic auxiliary power unit 20 in the motor mode, equally as in the pump mode can be expressed as $Q_{discharge} = n \cdot V_{stroke} \cdot 1/\eta_{vol}$ ($Q_{discharge}$: flow in m$^3$/s; n: revolutions per second; $V_{stroke}$: swept volume by the pistons in the m$^3$; $\eta_{vol}$: volumetric efficiency). During operation $\eta_{vol}$ can be treated as largely constant and also n can be seen as largely constant because the main drive 10 is normally an internal combustion engine being operated at a predetermined rotational frequency which allows for its most efficient operation, the flow $Q_{discharge}$ will thus be largely proportional to the swept volume by the pistons as for example controlled by the setting of the swash plate. The control of the swept volume by the pistons Vstroke and consequently the control of the flow $Q_{discharge}$, also here allows for the control of the amount of the power exchanged from the hydraulic auxiliary power storage 30 to the main drive 10 as, also in the motor mode, in general $P_{hydr,discharge} = Q_{discharge} \cdot \Delta p_{discharge}$ ($P_{hydr,discharge}$: Power in Watt (Nm/s); $Q_{discharge}$: flow in m$^3$/s; $\Delta p_{discharge}$: pressure difference over the pump in N/m$^2$;). As shown in FIG. 1C, the state of the hydraulic selection circuit 70 is such that the associated hydraulic valve 72 of the hydraulic accumulator 60 of the first subset 62 allows a flow of hydraulic fluid from this accumulator 60 via the additional hydraulic valve 74 to the storage side 28 of the power unit 20 being operated in a motor mode and thus providing additional power to supplement that of the main drive 10 during the activated time period 110 of the intermittent auxiliary drive 40. This flow of hydraulic fluid will cause the pressure in this hydraulic accumulator 60 of the first subset 62, and thus also at the storage side 28 of the hydraulic power unit 20, to fall, for example from a pressure above 400 bar to a pressure below 300 bar, as will be explained in further detail with reference to FIG. 3. The flow of hydraulic fluid will then continue its path from the source side 26 of the hydraulic auxiliary power unit 20 to the pressure control valve 86 of the anti-cavitation circuit 80 and then further to the reservoir 24. The pressure control valve 86 allows a suitable flow of hydraulic fluid from the source side 26 of the hydraulic auxiliary power unit 20 to the reservoir 24 such that the pressure at the source side 26 is kept at the predetermined opening pressure of for example 16 bar. In the embodiment shown in FIG. 1C both one way valves 82, 84 will be in a closed state. The first one way valve 82 because in this embodiment the predetermined pre-charge pressure of the pre-charge pump 22 is chosen to be slightly lower than the opening pressure, for example 15 bar. This will cause the pre-charge pump 22 in this embodiment implemented as it is a variable displacement hydraulic pump to operate in an overpressure protection mode by suitably minimizing the amount of hydraulic flow so that the pressure at its outlet side would not exceed the predetermined pre-charge pressure. It is clear that in this way the first one way valve 82 prevents that the flow of hydraulic fluid originating from the hydraulic power storage 30 would flow in the direction of the pre-charge pump 22. It is also clear that the second one way valve 84 will be in a closed state as the pressure at the storage side 28 of the hydraulic auxiliary power unit 20 will be higher than the pre-charge pressure when the hydraulic power unit 20 is operated in the motor mode being driven by the flow of hydraulic fluid originating from the hydraulic accumulator 60 of the first subset 62. It is further clear that, in the alternative embodiment of the pre-charge pump 22 is embodied as a fixed displacement pump, and in which the pre-charge pressure is equal to or higher than the opening pressure, the one-way valve 82 will allow for evacuation of the flow of hydraulic fluid generated by the pre-charge pump 22. In that case both the flow of hydraulic fluid generated by the pre-charge pump 22 and the flow of hydraulic fluid coming from the source side 26 of the hydraulic power unit 20 will flow through the branch of the pressure control valve 86 to the reservoir. It is further clear that, as shown, in this state of the hydraulic selection circuit both associated valves 72 of the two hydraulic accumulators 60 of the second subset 64 are controlled by the electronic controller 52 to a state in which they disconnect these hydraulic accumulators 60 of the second predetermined selection 64 from the hydraulic power unit 20.

Figure 1D:
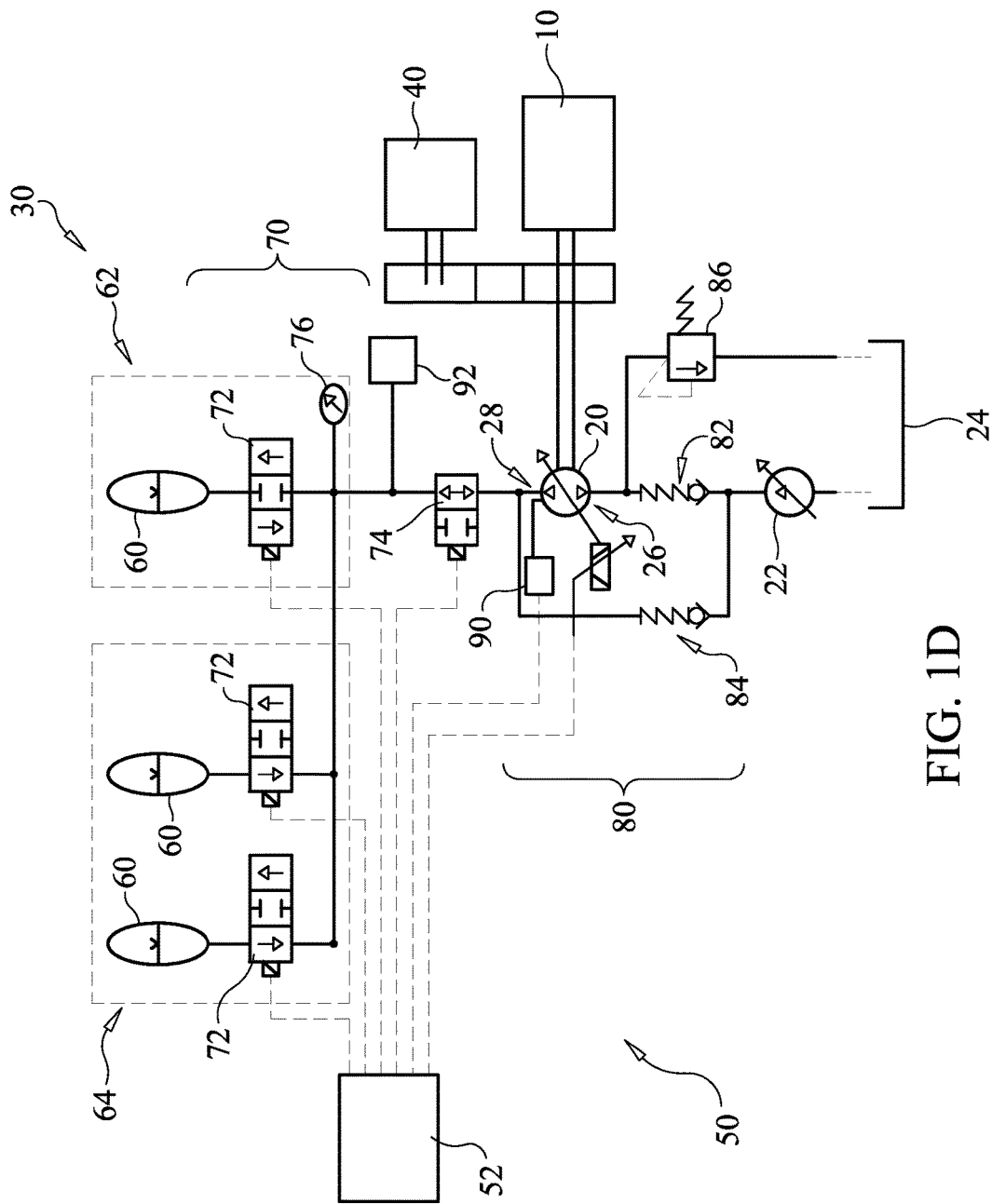

The state of the embodiment shown in FIG. 1D resembles the state of that of this embodiment in FIG. 1C, as also in this state the hydraulic power unit is operated in the motor mode. The main difference is to be found in the state of the hydraulic selection circuit 70. According to the state of the hybrid drive system shown in FIG. 1D, now the associated hydraulic valve 72 of the single hydraulic accumulator 60 of the first subset 62 is controlled by the electronic controller 52 to a state in which it disconnects this hydraulic accumulator 60 of the first subset 62 from the hydraulic power unit 20. In this state, the associated hydraulic valves 72 of both hydraulic accumulators 60 of the second subset 64 now connect these hydraulic accumulators 60 to the hydraulic power unit 20 in such a way that a flow of hydraulic fluid is allowed to flow from both these hydraulic accumulators 60 to the hydraulic power unit 20. All other elements such as for example the additional valve 74, the hydraulic power unit 20, the anti-cavitation circuit 80, the pre-charge hydraulic pump 22, . . . will function in general as described above with reference to FIG. 1C. This thus means that the hydraulic power unit 20 will be operated in a motor mode by the power exchange control system 50 and will be driven by a flow of hydraulic fluid from the hydraulic accumulators 60 of the second subset 64 arriving at the storage side 28 via both associated hydraulic valves 72 and the additional valve 74. This will also cause the hydraulic pressure in both these hydraulic accumulators 60 and thus also at the storage side 28 to fall, as will be explained in more detail with reference to FIG. 3, for example from a pressure above 400 bar to a pressure below 300 bar.

According to the embodiment shown in FIGS. 1A-1D, the hydraulic power unit 20 is a single hydraulic unit operable in both a hydraulic motor mode and a hydraulic pump mode. However, according to alternative embodiments the hydraulic auxiliary power unit 20 could comprise a plurality of hydraulic units for enabling the desired bidirectional power exchange between the main drive 10 and the hydraulic power storage 30, such as for example a suitable combination of a separate hydraulic pump for exchanging power from the main drive 10 to the hydraulic power storage 30 during the deactivated time period 120 and a separate hydraulic motor for exchanging power from the hydraulic power storage 30 to the main drive 10 during the activated time period 110.

When the hydraulic power unit 20 is operated in the motor mode by the electronic controller, there exists a risk of cavitation when the flow of hydraulic fluid is interrupted. This would be the case when all hydraulic accumulators 60 of the hydraulic power storage 30 are disconnected from the auxiliary power unit 20, for example because all associated valves 72 are in a closed state or alternatively because valve 74 is in a closed state. In that case the flow of hydraulic fluid from the hydraulic power storage 30 will stop and the pressure at the storage side 28 will fall and as soon as it falls below the pressure provided by the pre-charge pump 22 one-way valve 84 will open and a flow of hydraulic fluid will be provided by the pre-charge pump to the storage side 28 of the hydraulic accumulator 20 which will subsequently be evacuated via the pressure control valve 86 to the reservoir 24, thus preventing the risk of cavitation in this situation. It is clear that further embodiments of the anti-cavitation circuit 80 of the hydraulic control system 50 could be provided, alternative to the one shown in FIGS. 1A-1D. In general such an anti-cavitation circuit 80 must be able to provide hydraulic fluid to the storage side 28 of the hydraulic auxiliary power unit 20 when it is operated in the hydraulic motor mode and it is disconnected from all hydraulic power storage units 60 of the hydraulic auxiliary power storage 30.

Figure 3:
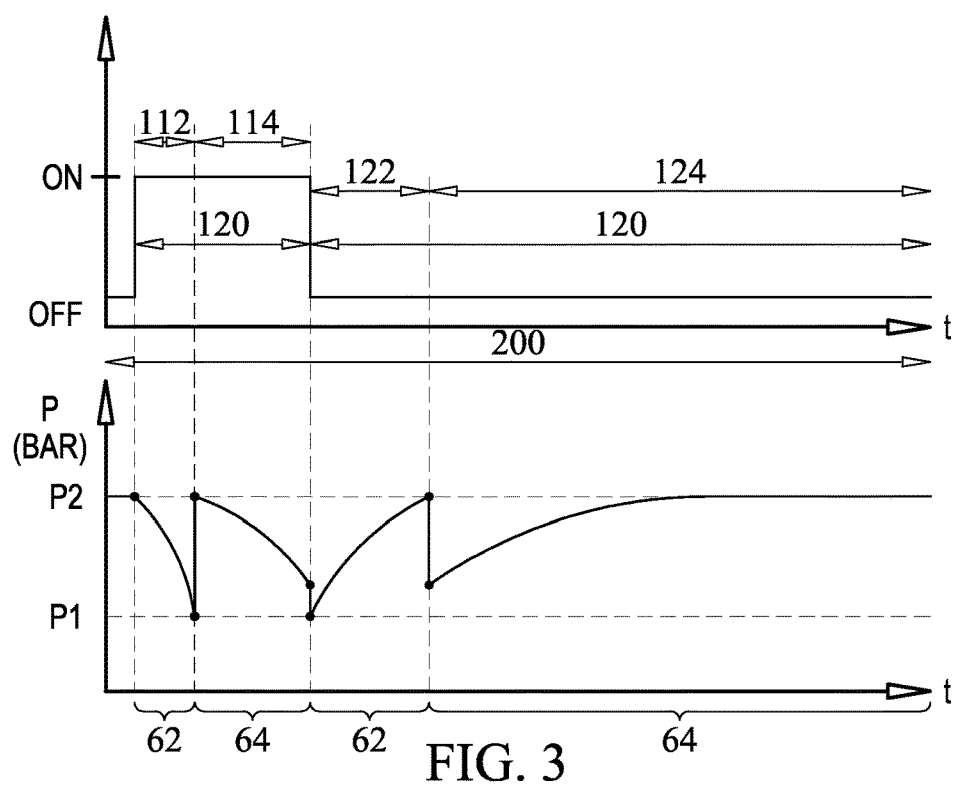
FIG. 3 schematically illustrates in further detail for an operating period of the auxiliary load the pressure values in a plurality of predetermined selections of hydraulic power storage units according to the embodiment of FIG. 1A.

As already explained with reference to FIG. 2, the intermittently operated auxiliary drive 40 comprises an operating period 100 comprising alternatingly an activated time period 110 and a deactivated time period 120 which is also indicated in FIG. 3. In the case of a grain unload auger as auxiliary drive this activated time period 110 during which grain is unloaded could for example last for about 1 minute, while the deactivated time period for example lasts for about 3 minutes. During a harvest operation such an operating period 100 would be cyclically repeated, however it is clear that variations in the duration of specific time periods might occur which cannot always be detected beforehand. This is for example the case in the example described above where the operating period is affected by the need to switch from a full first cart to another empty second cart while the harvester continues its harvesting operation. As further indicated in FIG. 3 and also mentioned with respect to FIG. 2, the activated time period 110 comprises a peak load time period 112 and a nominal load time period 114. This peak load time period 112, as shown in FIG. 3, comprises the initial phase of the activated time period 110 during which the intermittent auxiliary drive 40 is activated and causes a peak load to occur during a start-up time period caused by a peak torque to be provided in order to allow for the initial acceleration of the auxiliary drive 40 when switching from its deactivated state to the activated state. It is clear that during this peak load time period 112 the average power required by the intermittent auxiliary drive 40 is higher than the average power required by the intermittent auxiliary drive 40 during the activated time period 110 in its entirety because of this peak load occurring during the start-up time period. This peak load time period could for example last about 5 to 10 seconds and in this way comprise a 5 second start-up time period. As shown in the upper part of FIG. 3 this peak load time period 112 is followed by a nominal load time period 114 during the rest of the activated time period 110, which could for example last about 50 to 55 seconds. The lower diagram shows the pressure measured by the pressure sensor 76, which as shown in FIGS. 1A-1D, and is arranged to measure the pressure in the hydraulic accumulators 60 when they are connected to the storage side 28 of the hydraulic auxiliary power unit 20. It is clear that alternative embodiments are possible of the intermittent auxiliary drive in which the peak loads not necessarily occur at start-up or wherein the peak load time period 112 is not situated at the start of the activated time period 110, but for example at the end or another relative location within the activated time period 110. It is further also possible that the activated time period 110 comprises a plurality of peak load time periods 112 suitably alternating with nominal load time periods 114. According to an alternative embodiment each of the hydraulic accumulators 60 could be connected continuously to a dedicated pressure sensor. According to still a further alternative embodiment there could be provided a dedicated pressure sensor for each of the subsets 62, 64. This pressure sensor 76 is preferably suitably connected to the electronic controller 52 of the power exchange control system 50. As shown in FIG. 3 the power exchange control system 50 will during the peak load time period 112 connect the first subset 62 to the hydraulic auxiliary power unit 20 which is then operating in a motor mode and thus corresponds to the state of the hybrid drive system shown in FIG. 1C. As explained with reference to FIG. 1C this will cause the pressure in the hydraulic accumulator 60 of the first subset 62 to fall. As shown in FIG. 3 the pressure, measured with pressure sensor 76, will fall from a pressure value indicated as p2, for example 400 bar, to a pressure value indicated as p1, for example 300 bar. Subsequently during the nominal load time period 114 the power exchange control system 50 will connect the hydraulic accumulators 60 of the second subset 64 to the hydraulic power unit 20 still operating in a motor mode. The state of the hybrid drive system is then that described with reference to FIG. 1D. As shown in FIG. 3 the pressure in the hydraulic accumulators of the second subset 62 will equally fall from their initial value p2, for example 400 bar, to a lower value, for example 325 bar. As further shown in FIG. 3 the deactivated time period 120, of for example 3 minutes, comprises an initial deactivated time period 122 of for example 1 minute, followed by a subsequent deactivated time period 124 of for example 2 minutes. Similarly as during the activated time period 120, the power exchange control system 50 will selectively connect the first subset 62 and the second subset 64 of the hydraulic accumulators 60 to the hydraulic power unit 20. During the initial deactivated time period 122 the first subset 62 will be connected to the hydraulic power unit 20 operating in the pump mode, the hybrid drive system then being in the state described with reference to FIG. 1A. This will cause the pressure in this hydraulic accumulator 60 of the first subset 62 to rise as illustrated from the pressure value p1 of for example 300 bar to the pressure value of p2 of for example 400 bar. Subsequently, during the subsequent deactivated time period 124, the hydraulic accumulators 60 of the second subset 64 will be connected to the hydraulic power unit 20 and the hybrid drive system will be in the state shown in FIG. 1B. As shown in FIG. 3, this will cause the pressure in the hydraulic accumulators 60 of the second subset 64 to rise from its lower pressure value of for example 325 bar to the pressure value of p2 of for example 400 bar. According to the embodiment described above, subsequently the power exchange control system 50 will continue a cyclic mode of operation with a repetition of a plurality of similar intermittent operating periods 100 and corresponding time periods of the intermittent operation of the auxiliary drive 40 as illustrated in FIG. 3.

The power exchange control system 50 in this way allows for an additional means of control of the power exchange by the auxiliary power unit 20 between the hydraulic power storage 30 and the main drive 10 in function of the operating period 100 of the auxiliary drive 40. By means of selectively connecting a subset 62, 64 of one or more of the hydraulic power storage units 60 to the hydraulic power unit 20 the hybrid drive system is able to cope advantageously with peak loads for example generated during a start-up period of the auxiliary drive 40. As explained above the power exchanged by means of the hydraulic auxiliary power unit 20 can be expressed as $P_{hydr,discharge} = Q_{discharge} \cdot \Delta p_{discharge}$. This means that the amount of power transferred is a function of the variable flow $Q_{discharge}$ that can be regulated by the power exchange control system 50, but also of the pressure difference $\Delta p_{discharge}$ over the hydraulic power unit 20. This pressure difference $\Delta p_{discharge}$ corresponds to the pressure in the one or more hydraulic accumulators 60 of the subset 62, 64 that is being connected to the storage side 28 of the hydraulic auxiliary power unit 20, minus the pre-charge pressure provided at the source side 26. This means that, in order to cope with the peak load generated by the auxiliary drive 40 during the peak load time period 112 in a reliable and robust way, it must be assured that the maximum pressure difference $\Delta p_{discharge}$ is available over the hydraulic power unit 20, so that in combination with the maximum flow $Q_{discharge}$ the hydraulic power unit 20 is able to guarantee the delivery of the required maximum peak power to the main drive 10. When for example for the embodiment of FIGS. 1A-1D:

all three hydraulic accumulators 60 have the same capacity of 50 litres, thus forming a total capacity of the hydraulic auxiliary storage system 30 of 150 litres;

a pressure exceeding 350 bar would be required to overcome the peak load during the initial seconds of the peak load time period 112;

the main drive 10, during the deactivated time period 120 of the auxiliary drive 40, is able to deliver an amount of excess power to drive the hydraulic auxiliary power unit 20 so that it would take a time period of 3 minutes to provide all three hydraulic accumulators 60 of the hydraulic auxiliary storage system 30 with the total capacity of 150 litres at the required pressure exceeding 350 bar, this would mean that when all hydraulic accumulators 60 of the hydraulic power storage 30 would be pressurised together and the deactivated time period would be shorter than 3 minutes there is a risk that the required pressure level to cope with the peak load would not be reached. It is clear that with the hybrid drive system of the embodiment of FIGS. 1A-1D, the first subset 62, comprising a storage capacity less than the total capacity of the hydraulic storage system 30, can be provided with the required amount of hydraulic fluid at the required pressure level in a shorter period of time making use of the same amount of excess power of the main drive 10 during the deactivated time period 120. So again taking the exemplary values mentioned above, the first subset 62 would have a capacity of 50 litres (one hydraulic accumulator 60 of 50 litres), and thus could be fully pressurized about three times faster than the total hydraulic storage system 30 with a capacity of 150 litres (three hydraulic accumulators 60 of 50 litres), this thus reduces the required charging time about three times from three minutes to one minute.

Figure 4:
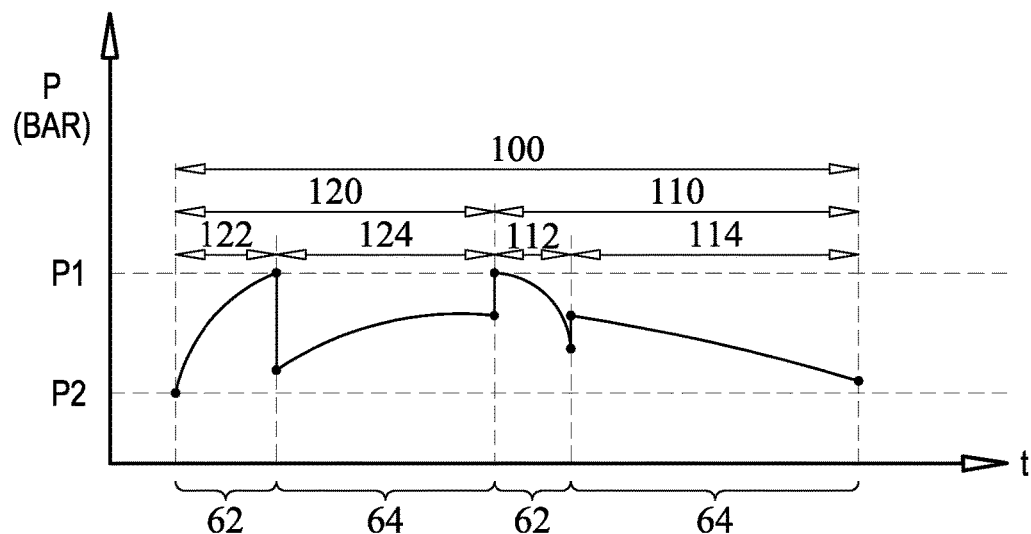
FIG. 4 schematically illustrates for the embodiment of FIG. 1A, pressure values for an operating period alternative to that of FIG. 3.

FIG. 4 illustrates this effect in more detail. This means, as shown in FIG. 4, that during the initial deactivated time period 122, the hydraulic accumulator 60 of the first subset 62 can be charged in about one minute during which the pressure in the hydraulic accumulator 60 rises from p1=300 bar to p2=400 bar. As shown in this example, where the deactivated time period 120 is too short to charge all three hydraulic accumulators 60 of the hydraulic storage system 30, for example 2.5 minutes, which would thus result in a subsequent deactivated time period 124 of 2.5 minutes–1 minute=1.5 minutes. As shown, during this subsequent deactivated time period 124 the two hydraulic accumulators 60 of the second subset 64 are not able to reach the pressure p2 before the start of the activated time period 110. However, as shown, this does not affect the reliable operation of the hybrid drive system during the peak load time period as the fully charged hydraulic accumulator 60 of the first subset 62 is then used to provide sufficient power to the main drive to cope with the peak load. Subsequently during the nominal load time period 124 the pressure in the hydraulic accumulators 60 of the second predetermined selection 64 will suffice to provide the additional power requirements of the main drive 10, which are lower than during the peak load time period. In this way, for the same amount of excess power available from the main drive 10 during the deactivated time period 120, a more robust hybrid drive system can be achieved. This alternatively also means that power requirements for the main drive 10 of the hybrid drive system can be reduced without compromising the performance of handling peak loads. This is accomplished by the power exchange control system 50 connecting, by means of the hydraulic selection circuit 70, the first subset 62 during the peak load time 112 and during the initial deactivated time period 122, the hydraulic storage capacity of the first subset 62 in this way allowing for a faster build-up of hydraulic pressure during the initial deactivated time period 122 such that maximum peak power can subsequently be delivered during the peak load time period 112; and by connecting the second subset 64 during the nominal load time period 114 and during the subsequent deactivated time period 124, the total hydraulic storage capacity of the one or more other subsets 64, 66 in this way ensuring that these other subsets 64, 66 allow for a larger amount of pressurized hydraulic fluid to be stored during the subsequent deactivated time period 124 to cover the power requirements during the nominal load time period 114.

Figure 6:
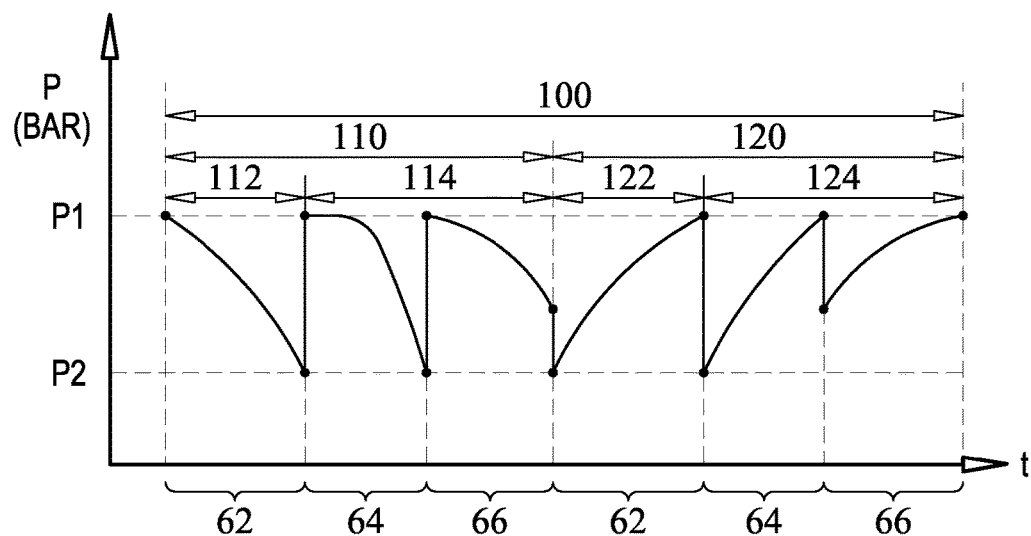
FIG. 6, schematically illustrates pressure values for an operating period of the embodiment of FIG. 5.
Figure 5A:
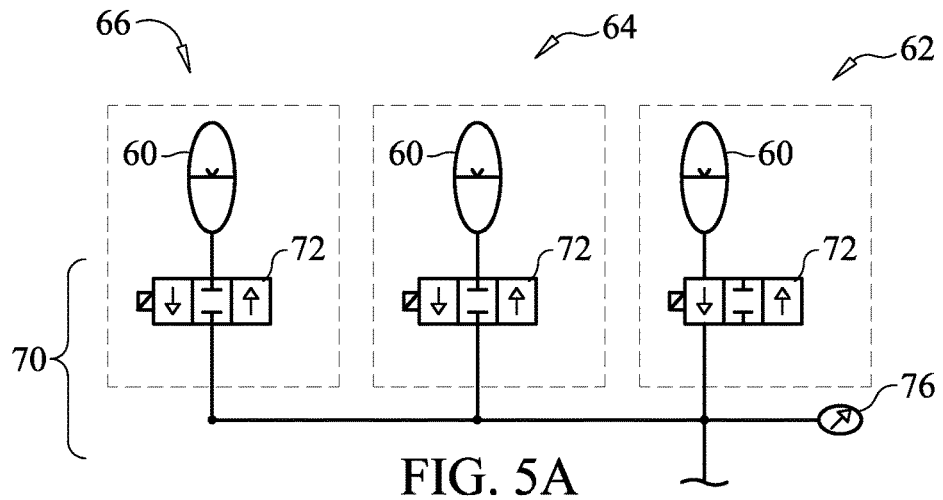
FIGS. 5A-5C, partially illustrates an alternative plurality of predetermined selections of the hydraulic power storage units for the embodiment of FIG. 1A.
Figure 5B:
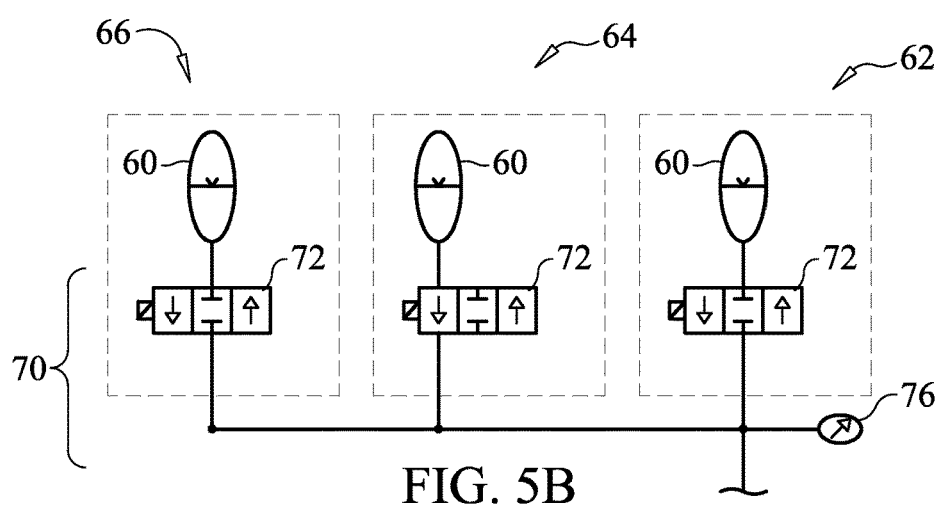
Figure 5C:
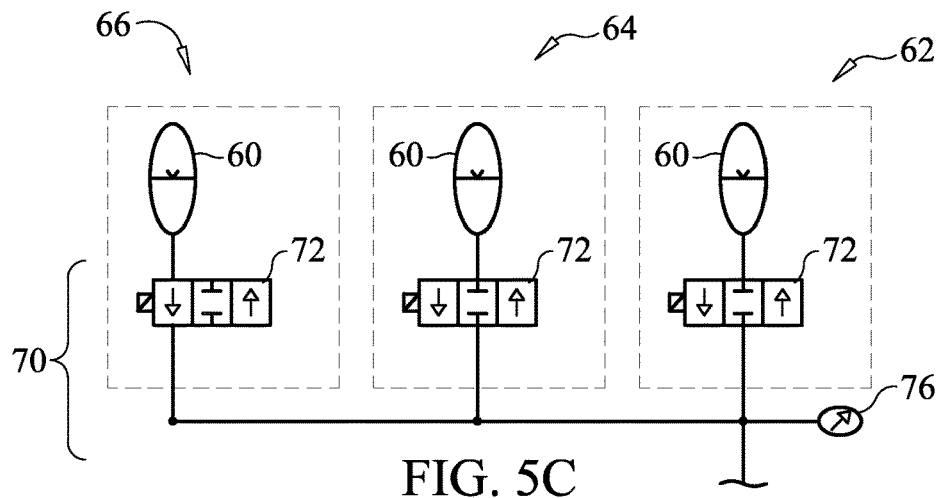

FIGS. 5A-5C show a similar hydraulic storage system 30 as in the embodiment of FIGS. 1A-1D. All other elements are identical to FIGS. 1A-1D and are no longer represented for the sake of brevity. Although the hydraulic hardware is identical to that illustrated with reference to FIGS. 1A-1D. However now the power exchange control system 50 operates the selection circuit 70 in such a way that there is a first subset 62, a second subset 64 and a third subset 66, each comprising a hydraulic accumulator 60. As shown in FIG. 6, the operation during the peak load time period 112 and the initial deactivated time period 122, is similar as that described with reference to FIGS. 3 and 4 for the embodiment of FIGS. 1A-1D. This means that during these time periods the power exchange control system 50 will, by means of the selection circuit 70, connect the first subset 62 to the hydraulic power unit 20. The state of the selection circuit 70 during the peak load time period 112 is shown in FIG. 5A and corresponds to that of FIG. 1A. However during the nominal load time period 114 and the subsequent deactivated time period 124 the hydraulic accumulator 60 of the second subset 64 and the hydraulic accumulator 60 of the third subset 66 are sequentially connected to the hydraulic power unit 20. This is realised by the selection circuit 70 that first operates in the state of FIG. 5B only connecting the second subset 64 and subsequently operates in the state of FIG. 5C connecting only the third subset 66 to provide hydraulic flow to the hydraulic power unit 20 operating in the motor mode. It is clear from FIG. 6 that a similar mode of operation of the selection circuit 70 is used during the subsequent deactivated time period 124, but then for sequentially allowing hydraulic fluid from the hydraulic power unit 20, now operating in pump mode, to flow into the second subset 64 and subsequently into the third subset 66.

In this way, also for this embodiment, and for any other embodiment comprising any other suitable plurality of other subsets different from the first subset, for the same amount of excess power available from the main drive 10 during the deactivated time period 120, a more robust hybrid drive system can be achieved. Alternative embodiments with two, three, four, five, etc. other subsets are thus possible. Also alternative embodiments with predetermined selections comprising a suitable plurality, such as one, two, three, four, five, etc. of hydraulic accumulators 60 forming such a subset are possible. According to still further embodiments some of the hydraulic accumulators can be part of more than one of the different subsets. It is for example possible that the first subset 62 comprises one hydraulic accumulator of the plurality of hydraulic accumulators of the hydraulic storage system 30 and that the second subset 64 being used during the nominal load time period 114 is formed by all hydraulic accumulators of the hydraulic storage system 30, including the hydraulic accumulator 60 that was forming the first subset 62. It is also not required for each of these hydraulic accumulators to be of the same type or to comprise the same hydraulic storage capacity. It is further clear that this effect can already be advantageously be achieved when the first subset 62 comprises a hydraulic storage capacity that is smaller than or equal to the total hydraulic storage capacity of the second and third subset 64, 66. This is the case in the examples above where the hydraulic storage capacity of the first subset 62 was 50 litres and the total storage capacity of the second and third subset 64, 66 was 100 litres. However the preferred configuration, which was described in the examples with reference to the embodiment in FIGS. 5A-5D is when also the hydraulic storage capacity of the first subset 62 is smaller than or equal to the individual hydraulic storage capacity of the second subset 64 and third subset 66, as it is then assured that the first subset 62 can be pressurized in the shortest possible initial deactivated time period 122. According to an alternative exemplary embodiment the first subset 62 could comprise a hydraulic accumulator 60 with a storage capacity smaller than the 50 litres of the hydraulic accumulators 60 of the second and third subsets 64, 66, for example in the range of 20 to 40 litres. This would shorten even further the time to fully pressurize the first subset 62 when compared to the other predetermined selections 64, 66, however the storage capacity of the first subset must still be sufficiently large to cover the time period during which the peak loads occur in the peak load time period 112. It is further clear that according to other alternative embodiments other predetermined sequences or predetermined combinations of sequences for connecting one or more predetermined selections of one or more of the hydraulic power storage units 60 to the hydraulic power unit 20 are possible. In general, all these embodiments will allow the power exchange control system 50 to control the desired bidirectional power exchange between the main drive 10 and the hydraulic power storage 30 by means of the hydraulic power unit 20 in function of the operating period 100 by means of selectively connecting the first subset and at least one different, other subset.

Although, in the exemplary embodiments reference has been made to a predetermined duration of time periods of the operating period 100 and this allows for a particular simple implementation of the hydraulic control system 50, according to an alternative embodiment one or more of the time periods of the operating period could be determined in function of measurements of the hydraulic pressure sensor 76 that is able to measure the hydraulic pressure in the hydraulic power storage units 60 in such a way that for example the electronic control system 52 of the power exchange control system 50 can store the measured pressure in each of the hydraulic accumulators 60. The electronic controller 52 of the hydraulic control system is then for example able to switch from the initial deactivated time period 122 to the subsequent deactivated time period 124 when the pressure in the hydraulic power storage unit 60 of the first predetermined selection 62 reaches an upper pressure threshold, for example the pressure value $p_2$=400 bar as discussed with reference to FIGS. 3, 4 and 6. This allows for additional flexibility and robustness as such a mode of operation allows for a greater range of tolerance on the length and height of the peak load occurring in different operating conditions to which the main drive 10 and the auxiliary drive 40 are subjected. A similar mode of operation could be proposed for determining when to switch from the peak load time period 112 to the nominal load time period, by performing the switch when the pressure in the hydraulic power storage units 60 of the first subset 62 reaches a lower pressure threshold, for example the pressure value p1=300 bar as discussed with reference to FIGS. 3, 4 and 6. Additionally with reference to the mode of operation as illustrated in FIG. 6, also the switch from the second subset 64 to the third subset 66 during the nominal load time period 114 and the subsequent deactivated time period 124 can be effected by the hydraulic control system when the pressure sensor 76 detects a pressure value reaching the lower pressure threshold p1 or upper pressure threshold p2 respectively.

In order to further optimize the hybrid drive system, especially in the specific case as already mentioned above, where the main drive 10 is an internal combustion engine and the intermittent auxiliary drive 40 is a crop unloading system to intermittently unload harvested crop from a crop storage bin of a harvester, the electronic controller 52 of the power exchange control system 50 is preferably able to adjust the upper pressure threshold p2 or the lower pressure threshold p1 in function of harvesting condition parameters. Such harvesting condition parameters could be parameters inputted by an operator or parameters determined by means of suitable sensors available on the harvester, which are then transferred in a suitable way to the electric controller 52 of the power exchange control system 50 which will calculate or for example look up in suitable lookup tables the most suitable values for these pressure thresholds. Such harvesting condition parameters could for example be:
- type of crop being harvested;
- filling degree of the crop storage bin;
- moisture content of the crop;
- blockage detection of the crop unloading system;
- average load on the main drive 10.

As further shown in the embodiment of FIGS. 1A-1D the hydraulic power exchange control system 50 preferably comprises an overpressure protection circuit 90 coupled to the hydraulic auxiliary power unit 20. This overpressure protection circuit 90 prevents further pressure generation at the storage side 28 of the hydraulic auxiliary power unit 20, when the hydraulic power unit 20 is operated in the hydraulic pump mode and the pressure at the storage side 28 of the hydraulic power unit 20 exceeds an overpressure threshold. This can be accomplished by means of a suitable control of the variable flow capabilities of the hydraulic power unit 20, so that no additional flow is generated when the overpressure threshold is reached. Alternatively the overpressure protection circuit 90, could equally be formed by means of suitable hydraulic elements, such as for example a normally closed pressure regulator valve connecting the storage side 28 to the reservoir, which opens when the pressure at the storage side 28 would exceed the overpressure threshold. When this overpressure threshold is set to be equal to the upper pressure threshold p2 as mentioned with reference to the embodiments described above, this will further simplify the operation of the electronic controller 52 of the power exchange control system 50 as this will prevent the pressure in the hydraulic accumulators 60 from rising above this upper pressure threshold p2 without requiring any additional control functionality from the electronic controller 52.

Still further shown in the embodiment of FIGS. 1A-1D is an optional, additional hydraulic circuit 92 that is connected to the hydraulic power storage 30. This additional circuit 92 could for example comprise a hydraulic bleed-off circuit that enables the hydraulic accumulators 60 of the hydraulic power storage 30 to discharge to the reservoir 24 without passing through the hydraulic power unit 20. Such functionality allows to de-pressurise the hydraulic power storage 30, for example in function of maintenance or repair operations to the hydraulic power unit 20. According to alternative embodiments the additional circuit comprise alternative hydraulic circuits, such as for example for supplying pressurised hydraulic fluid to hydraulic actuators directly, such as for example a hydraulic piston for adjusting the position of an component of the harvester such as a belt variator, a reel of header of a combine harvester, etc. or a hydraulic motor driving for example a cooling fan. Preferably these loads have relatively small power requirements when compared to the power requirements of the intermittent auxiliary drive 40 so that they don't disturb the operation of the power exchange control system 50 considerably. In this way the need for an additional hydraulic pressure pump to drive these hydraulic loads can be avoided.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A hybrid drive system for a harvester comprising:
a main drive;
a reservoir of hydraulic fluid;
a hydraulic power storage for storing hydraulic fluid at a pressure higher than that of the reservoir;
a hydraulic power unit mechanically connected to the main drive and hydraulically connected to the hydraulic power storage and to the reservoir;
an intermittent auxiliary drive configured to be powered intermittently by the main drive during an operating period such that the main drive powers the intermittent auxiliary drive during an activated time period and the main drive does not power the intermittent auxiliary drive during a deactivated time period;

a power exchange control system coupled to the hydraulic power unit and the hydraulic power storage;

the hydraulic power storage comprises a plurality of hydraulic power storage units;

wherein the power exchange control system is configured to:

selectively connect a first subset and at least one other subset of one or more of the hydraulic power storage units to the hydraulic power unit as a function of a desired bidirectional power exchange between the main drive and the hydraulic power storage as a function of the operating period;

determine for the activated time period a peak load time period during which an average power required by the intermittent auxiliary load is higher than the an average power required by the intermittent auxiliary load during the activated time period; and a nominal load time period during a remaining part of the activated time period; and determine for the deactivated time period an initial deactivated time period followed by a subsequent deactivated time period; and connect the first subset during the peak load time period and during the initial deactivated time period;

connect the at least one other subset during the nominal load time period and during the subsequent deactivated time period.

2. The hybrid drive system according to claim 1, wherein the power exchange control system is further configured to determine the peak load time period such that it comprises a start-up time period, which is an initial phase of the activated time period during which the intermittent auxiliary load is activated.

3. The hybrid drive system according to claim 1, wherein the first subset comprises a hydraulic storage capacity that is smaller than or equal to a total hydraulic storage capacity of the one or more other subsets, and in that the power exchange control system is configured to:

connect the first subset during the peak load time period and during the initial deactivated time period, the hydraulic storage capacity of the first subset in this way allowing for a faster build-up of hydraulic pressure during the initial deactivated time period such that maximum peak power can subsequently be delivered during the peak load time period and;

connect the at least one other subset during the nominal load time period and during the subsequent deactivated time period, the total hydraulic storage capacity of the one or more other subsets in this way ensuring that these other subsets allow for a larger amount of pressurized hydraulic fluid to be stored during the subsequent deactivated time period to cover power requirements during the nominal load time period.

4. The hybrid drive system according to claim 1, wherein the first subset comprises a hydraulic storage capacity that is smaller than or equal to an individual hydraulic storage capacity of the one or more other subsets and in that the power exchange control system is configured to:

connect the first subset during the peak load time period and during the initial deactivated time period, the hydraulic storage capacity of the first subset in this way ensuring that the first subset is the subset allowing for a fastest build-up of hydraulic pressure during the initial deactivated time period such that maximum peak power can subsequently be delivered during the peak load time period; and connect the at least one other subset during the nominal load time period and during the subsequent deactivated time period, the hydraulic storage capacity of each of the one or more other subsets in this way ensuring that these other subsets allow for a largest amount of pressurized hydraulic fluid to be stored during the subsequent deactivated time period to cover power requirements during the nominal load time period.

5. The hybrid drive system according to claim 1, wherein the power exchange control system is configured to connect a plurality of the other subsets in a predetermined sequence.

6. The hybrid drive system according to claim 1, wherein:

the plurality of hydraulic power storage units are a plurality of hydraulic accumulators; and the power exchange control system comprises a hydraulic selection circuit coupled to the hydraulic power unit and the plurality of hydraulic accumulators, the hydraulic selection circuit comprising a plurality of hydraulic valves respectively coupled to each of the plurality of hydraulic accumulators, the power exchange control system being configured to perform the selection of the subsets of the plurality of hydraulic accumulators by the plurality hydraulic valves.

7. The hybrid drive system according to claim 1, wherein the hydraulic power unit is a single hydraulic unit that is:

operable in both a hydraulic motor mode and a hydraulic pump mode; and connected at a source side to the reservoir of hydraulic fluid and at a storage side to an hydraulic auxiliary power storage; and the power exchange control system is configured to operate the hydraulic power unit in the hydraulic motor mode during the activated time period for exchanging power from the hydraulic auxiliary power storage to the main drive;

in the hydraulic pump mode during the deactivated time period for exchanging power from the main drive to the hydraulic auxiliary power storage.

8. A method of operating a hybrid drive system comprising a main drive, a reservoir of hydraulic fluid, a hydraulic power storage for storing hydraulic fluid at a pressure higher than that of the reservoir, a main hydraulic power unit mechanically connected to the main drive and hydraulically connected to the hydraulic power storage and to the reservoir, wherein the main hydraulic power unit comprises a plurality of hydraulic power storage units, an intermittent auxiliary drive configured to be powered intermittently by the main drive during an operating period such that the main drive powers the intermittent auxiliary drive during an activated time period and the main drive does not power the intermittent auxiliary drive during a deactivated time period and a power exchange control system coupled to the hydraulic power unit and the hydraulic power storage; the method comprising the steps of:

receiving with the power exchange control system an input signal representative of an intermittent operation of the intermittent auxiliary drive during the operation period;

determining an output signal with the power exchange control system from this input signal as a function of a desired bidirectional power exchange between the main drive and the hydraulic power storage during the operating period, wherein the output signal is configured for selectively connecting a first subset and at least one different, other subset of one or more of the hydraulic power storage units to the hydraulic auxiliary power unit;

providing the output signal to the hydraulic power storage with the power exchange control system;

determining for the activated time period using the power exchange control system:
 a peak load time period during which shell an average power required by the intermittent auxiliary load is higher than the average power required by the intermittent auxiliary load during the activated time period; and
 a nominal load time period during a remaining part of the activated time period;

determining for the deactivated time period an initial deactivated time period followed by a subsequent deactivated time period with the power exchange control system;

providing an output signal for connecting the first subset during the peak load time period and during the initial deactivated time period with the power exchange control system;

providing an output signal for connecting the at least one other subset during the nominal load time period and during the subsequent deactivated time period with the power exchange control system.

9. The method according to claim 8, wherein the method comprises the further steps of:
 determining a peak load time period with the power exchange control system such that it comprises a start-up time period, which is an initial phase of the activated time period during which the intermittent auxiliary load is activated.

10. The method according to claim 8, further comprising the steps of:
 determining and providing with the power exchange control system an output signal to connect a plurality of the other subsets in a predetermined sequence.

11. The method according to claim 8, wherein the power exchange control system is further connected to a hydraulic pressure sensor configured to measure a hydraulic pressure in the one or more hydraulic power storage units of the first subset when connected to the hydraulic power unit, wherein the method comprises the further steps of:
 the power exchange control system receiving an input signal from the hydraulic pressure sensor representative of the hydraulic pressure in the one or more hydraulic power storage units of the first subset when connected to the hydraulic power unit;
 wherein the power exchange control system is configured for at least one of
  switching from an initial deactivated time period to a subsequent deactivated time period when the hydraulic pressure in the one or more hydraulic power storage units of the first subset reaches an upper pressure threshold; and
  switching from a peak load time period to a nominal load time period when the hydraulic pressure in the one or more hydraulic power storage units of the first subset reaches a lower pressure threshold.

12. The method according to claim 11 for operating a hybrid drive system wherein:
 the main drive is an internal combustion engine;
 the intermittent auxiliary drive is operable to drive a crop unloading system configured to intermittently unload harvested crop from a crop storage bin of a harvester, the method comprises the further steps of:
 the power exchange control system receiving an input signal representative of one or more following harvesting condition parameters:
 type of crop being harvested;
 filling degree of the crop storage bin;
 moisture content of the crop;
 blockage detection of the crop unloading system;
 average load on the main drive;
 wherein the power exchange control system is configured for determining and providing an output signal to adjust at least one of the upper pressure threshold and the lower pressure threshold as a function of one or more of these harvesting condition parameters.

* * * * *